Dec. 6, 1949     A. GHIORSO ET AL     2,490,298

RADIATION DETECTING APPARATUS

Filed May 13, 1949     3 Sheets-Sheet 1

INVENTORS.
ALBERT GHIORSO
CARROLL M. GORDON
BY Roland A. Anderson
ATTORNEY.

Dec. 6, 1949     A. GHIORSO ET AL     2,490,298
RADIATION DETECTING APPARATUS
Filed May 13, 1949     3 Sheets-Sheet 3

INVENTORS.
ALBERT GHIORSO
CARROLL M. GORDON
BY Roland A. Anderson
ATTORNEY.

Patented Dec. 6, 1949

2,490,298

UNITED STATES PATENT OFFICE 2,490,298

RADIATION DETECTING APPARATUS

Albert Ghiorso, Berkeley, Calif., and Carroll M. Gordon, San Pablo, Calif., assignors to the United States of America as represented by the United States Atomic Energy Commission Application May 13, 1949, Serial No. 93,162

16 Claims. (Cl. 250—83.6)

1

This invention relates to apparatus for detecting radiation activities and more particularly to a new and improved structure adapted to handle radioactive materials removably contained within the structure.

In the art of radiation detection numerous structures employing electrical circuits with specific electrode arrangements, such as Geiger-Müller counters, ionization chambers, proportional counters and the like have been devised to provide certain types of information. Many of these structures employ, as an essential part of the apparatus, a chamber filled with a special type of gas.

So far as known, however, in all gas-filled structures of this nature in which provision is made for introducing into and removing from the chamber a sample under measurement, certain disadvantages in regard to sealing of movable surfaces and maintenance of desired electrical conditions are present. In the copending application of M. S. Freedman, Serial No. 759,526, filed July 8, 1947, one useful solution to these problems is disclosed but no means for expeditiously handling a plurality of samples is contemplated thereby.

One object of the present invention therefore is to provide an apparatus for handling a plurality of samples of radioactive material in a gas-filled chamber.

A second object is to provide a radiation detecting apparatus including a gas-filled chamber from which a minimum amount of gas is lost during the operation of the material transferring means.

Another object is to provide a radiation detecting apparatus including a gas-filled chamber in which dilution of gas is prevented during the material transferring operation.

A further object is to provide a new and improved radiation detecting apparatus including a gas-filled chamber in which no substantial fluctuations in pressure of the gas occurs during material transferring operation.

Still another object is to provide an improved material transferring structure adapted for use in connection with gas-filled radiation detectors.

Other objects and advantages will become more apparent as the description proceeds, when considered in connection with the accompanying specification and drawings, in which.

2

Figure 2:
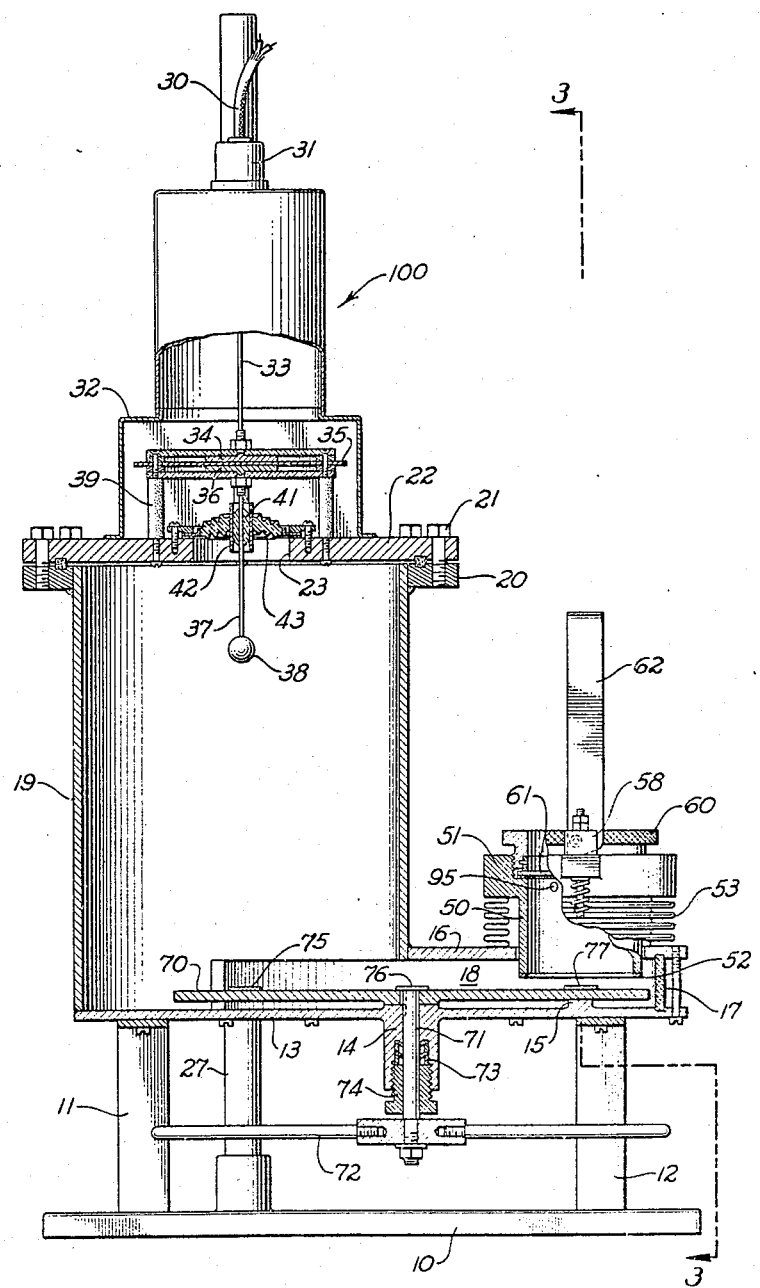
Fig. 2 is a sectional view of the structure taken along line 2—2 of Fig. 1.
Figure 3:
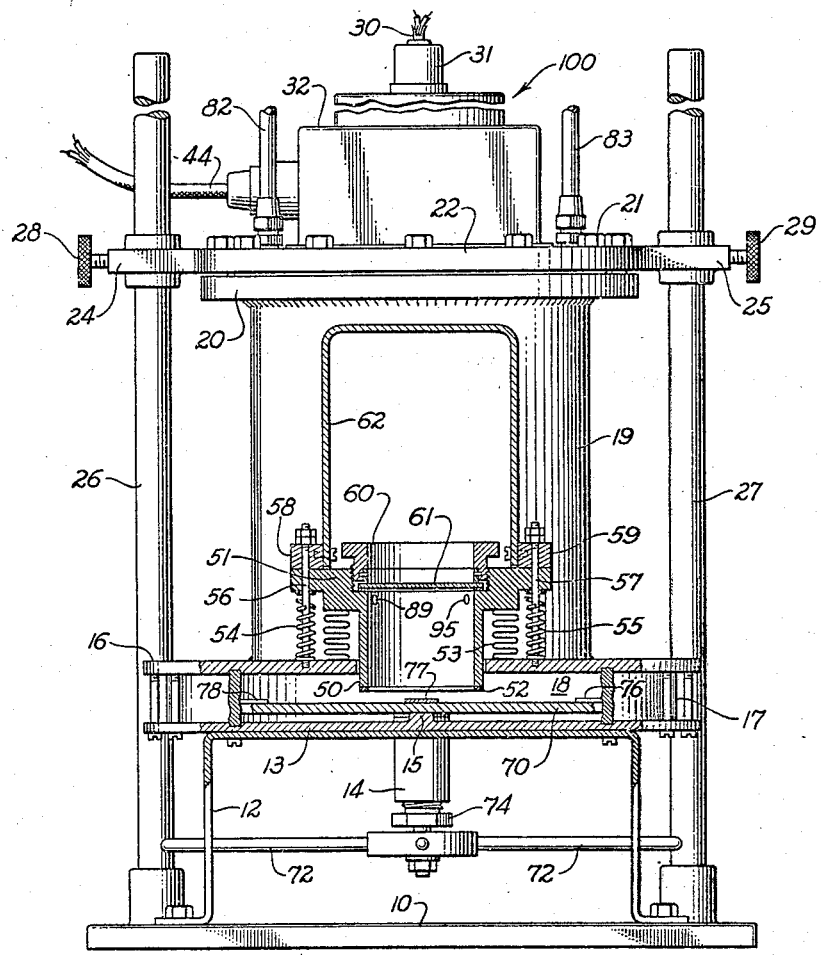
Figure 4:
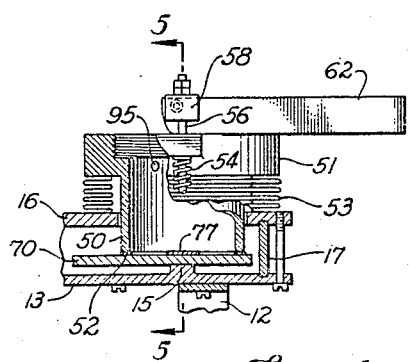
Figure 5:
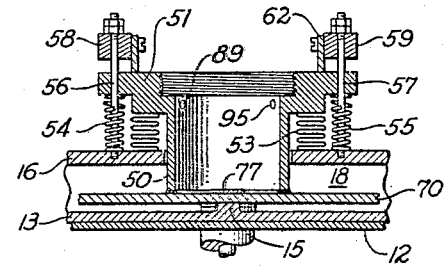

Fig. 3 is a sectional view of the structure taken along line 3—3 of Fig. 2;

Fig. 4 is a fragmentary sectional view showing the material transferring chamber in loading position with the cover removed;

Fig. 5 is a fragmentary sectional view taken on line 5—5 of Fig. 4; and

Figure 6:
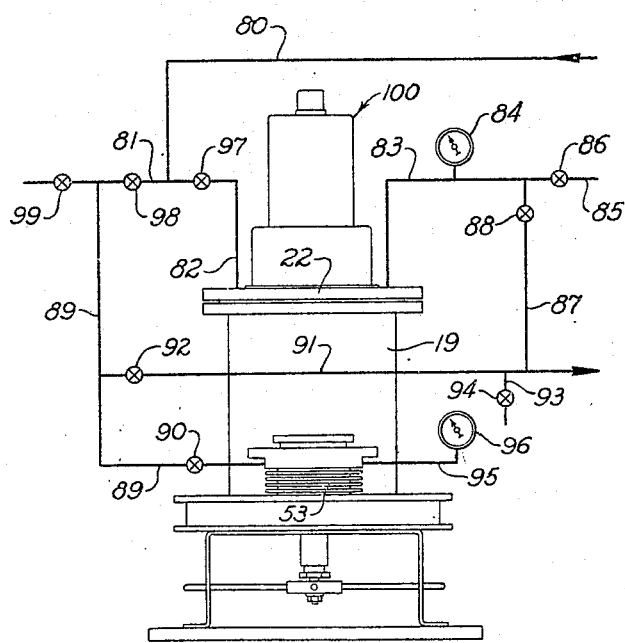

Fig. 6 is a diagrammatic view showing the vacuum, atmospheric, and gas supply connections for the structure.

Figure 1:
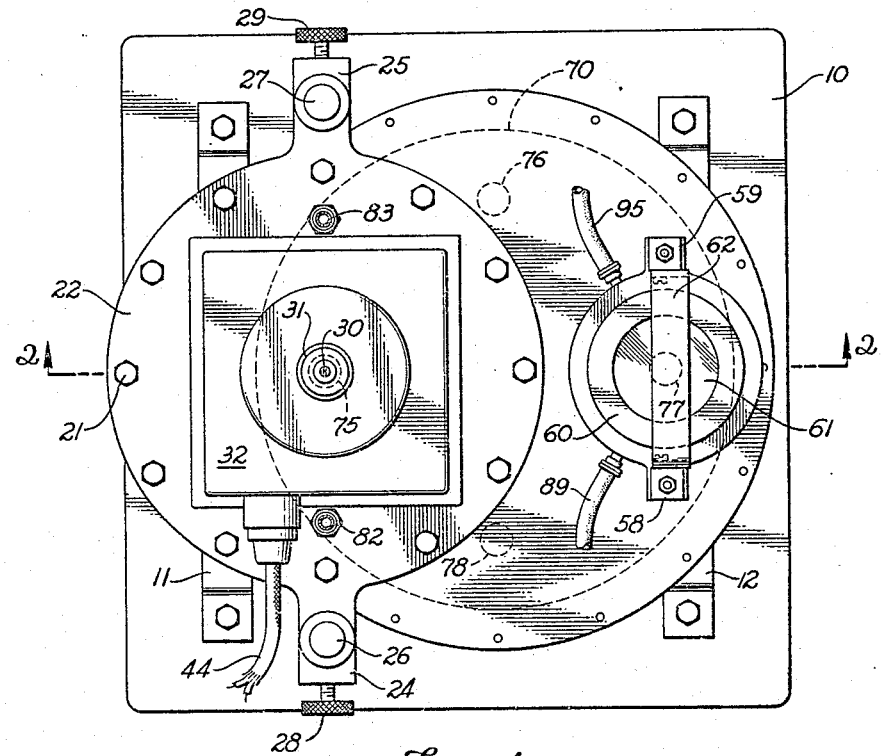
Figure 1 is a plan view showing the apparatus in operative position.

One form of structure in which the invention may be employed is shown in Figs. 1 to 3 in which a suitable base plate 10 is provided with brackets 11 and 12 serving to support the housing for the radiation detecting means at a convenient height. The housing may comprise a floor member 13 attached in any suitable manner to said brackets and provided on one side at a generally central location with an apertured hub section 14 and on the other side adjacent its periphery with a flat pedestal projection 15, the purpose of which will later become apparent.

A plate 16, preferably disposed parallel to the floor member 13 and spaced therefrom by a circular shaped wall member 17, serves to provide a space or passageway 18 communicating with the interior of a generally cylindrical chamber 19. This chamber preferably is affixed along one portion of the periphery of its lower end to the floor member 13 and at the remainder of such periphery to the plate 16, as by welding. Adjacent the upper end of chamber 19 a flange ring 20 is provided for engagement with a removable head assembly 100 adapted to be securely held in sealing engagement with the flange ring 20 as by means of a series of threaded bolts 21.

In its preferred form, the head assembly 100 supports all of the electrical components of the structure employed in the operation of the detector. Since the moving parts of the apparatus are thus separately spaced from this head assembly no subsequent mechanical adjustments of the electrical components are required after the head assembly has once been fixed in position and the electrical conditions for detection operation suitably established. The head assembly may comprise a massive plate 22 having a centrally disposed aperture 23 therein and provided with a pair of peripherally spaced apertured lugs 24 and 25 which in turn respectively surround a pair of vertically disposed guides 26 and 27. These guides may be mounted at their bases upon plate 10. Suitable retaining means, such as set screws 28 and 29 may be carried by the lugs for engagement with said guides.

Since the interior of the structure preferably is filled with a selected inert gas, such as argon, during operation, it will be apparent that the removable head assembly thus provides a convenient unitary construction to which the several electrical and gas connections can be readily attached. By detaching the plate 22 from flange 20, the entire assembly thus may be raised to a desired location on guides 26 and 27, while repair or inspection of the several connections is being made and this may be accomplished without disassembling any other part of the structure.

As best shown in Figs. 1 and 2, a conventional radiation detecting means having an electrical circuit leading to an appropriate measuring, counting or identifying mechanism (not shown) may be employed in combination with the apparatus herein disclosed. One form which this may take comprises an electrical lead 30 connected to a suitable means, such as a differential pulse analyzer, and extending through an insulator connection 31 provided in a metallic gas-tight housing 32 which is affixed to the upper surface of plate 22. Lead 30 terminates in a rigid rod 33 which is securely attached to one plate 34 of a fixed condenser, said plate 34 being disposed on one side of a suitable dielectric 35. To the other condenser plate 36, a rigid rod 37 terminating in electrode 38 is attached and such rod is of sufficient length to position the electrode at a suitable distance from the wall of chamber 19 and from the radioactive sample to be measured when the structure is in operative position. The condenser assembly, moreover, may be mounted upon plate 22 as by means of insulators 39 and the rod 37 may be rigidly held as by means of a suitable insulator 41 spacing the rod from a guard ring 42. Ring 42 in turn is fixedly supported within the aperture 23 of the plate 22 as by means of another insulator 43 suitably mounted on said plate.

A second electrical lead 44 is connected to the conducting housing 32 and thus enables a difference in potential to be established between the wall of chamber 19 and electrode 38.

For purposes of selective access to the interior of the structure above described, a hollow tubular sleeve 50 having an outwardly extending flange 51 near its top is mounted for reciprocatory movement in an aperture located near the periphery of plate 16. As best shown in Fig. 2, this sleeve is disposed above the pedestal support 15 provided on the inner side of the floor member 13. A sealing strip 52, the purpose of which will later become evident, is provided on the lower edge of sleeve 50 and the aperture in which the sleeve moves preferably is large enough to permit said sleeve to rock slightly in any desired radial direction. To provide a gas tight enclosure about the movable sleeve, the same may be provided with a flexible sealing means or jacket 53, such as a bellows, which is affixed at one end to the movable flange 51 and at its other end to the fixed plate 16.

As best shown in Fig. 3, the sleeve 50 is normally held in a retracted outward position by means of one or more compression springs 54 and 55 surrounding one or more fixed guide rods 56 and 57, respectively, said rods extending loosely through apertures provided in suitable extension on flange 51 and terminating at one end in the fixed plate 16 and at the other end in blocks 58 and 59 mounted upon said rods. A threaded cap 60, preferably provided with a transparent insert 61, is adapted to be removably positioned in the interior of flange 51 and provides a means of access to the interior of sleeve 50 and thence to the interior of the entire structure, whenever desired. By means of any suitable lever 62 fulcrumed upon blocks 58 and 59 and having properly shaped cam surfaces, the entire sleeve assembly may be positively moved downwardly to the desired extent and can be retracted to the position shown in Fig. 2 by the action of the compression springs whenever lever 62 is raised.

Located within the passageway 18 between plate 16 and floor 13 is a conveying means adapted to transport material between the interior of sleeve 50 and the interior of chamber 19. One preferred form which such a means may take is illustrated as a rotatable table 70 having an actuating shaft 71 which is mounted in the hub 14 of the stationary floor member 13. The shaft may be turned by any suitable external means as, for example, a series of spokes 72 removably attached to said shaft. For providing a gas seal for the interior of the structure, as well as insuring a frictional resistance useful in positioning the table at a desired point, a gasket 73 held in place by a suitable adjustable bushing 74 may be employed. As will thus be apparent, any desired material or object, such as radioactive samples 75, 76, 77, and 78 may be introduced into the material transfer compartment defined by sleeve 50, placed upon the table 70, moved into the chamber 19, and thereafter moved again into the material transfer compartment.

With the foregoing structural disclosure in mind, reference now is made to Fig. 6 showing diagrammatically a preferred arrangement of inert gas, atmospheric and vacuum connections employed in combination with the structure and adapted to provide a flexible mode of operation. A suitable inert gas, such as argon, may be supplied under pressure through pipe 80 from any source (not shown) into the header pipe 81 which leads at one end into pipe 82 communicating with the interior of chamber 19 through the adjustable head 22. A second pipe 85 leading from chamber 19 may be provided with a gauge 84 and connects with a vent pipe 85 controlled by valve 86 and with a suction connection pipe 87 controlled by valve 88.

From header pipe 81 a pipe 89 leading to the interior of sleeve 50 may be provided, and this pipe also may be controlled by valve 90 and connect intermediate said valve and said header pipe with a suction pipe 91, which in turn is controlled by valve 92 and connected to pipe 87. In addition a vent pipe 93 controlled by valve 94 may likewise connect with pipe 91 at a convenient location.

From the sleeve 50 a second pipe 95 attached to a gauge 96 may be provided and for purposes of controlling flow in the header pipe 81, the valves 97, 98, and 99 may be used. In view of the attachment of certain pipes to the movable elements of the structure, such pipes may be of flexible construction or be provided with flexible connections without in any way departing from our invention.

With the foregoing structure in mind, the operation of the same may be noted from a comparison of Figs. 2 and 4. Assume that the interior of the structure, which has first been purged of atmospheric air, is now filled with inert gas at the proper pressure and that the measuring of a sample 75 has been completed. At this time valve 97 is open and all other valves preferably are closed. If now it is desired to remove the sample 75 from the structure, table 70 will then be rotated to bring sample 75 under the position of sleeve 50, whereupon lever 62 is moved downwardly camming the sleeve 50 down into contact with table 70 along sealing edge 52. Due to the position of pedestal 15, this pressure will not tend to bind the table 70 along its shaft 71. With the sleeve 50 thus depressed, the cover 60 may then be removed, permitting air to fill only the limited confines of the interior of the sleeve and the pipes 89 and 95. It will be noted that this volume is only a small fraction of the entire interior volume of the structure. While the cover is thus removed, sample 75 may be taken out and a new sample substituted therefor on table 70. Thereupon cover 60 may be replaced. However, the air now entrapped within the structure would dilute the inert gas if sleeve 50 were raised at this moment, and in order to prevent this the vacuum line 91 is now connected to the interior of the sleeve by opening valves 90 and 92. After gauge 96 shows that the sleeve has been evacuated to the desired extent, valves 90 and 92 are reclosed, whereupon the user may follow either of two alternatives. Firstly, he may immediately raise lever 62 and permit the sleeve 50 to retract and an inert gas balance to result by makeup gas flowing from chamber 19 and pipe 82 until gauge 84 shows the desired over-all reading. Secondly, he may first open valves 90 and 98 and permit gas to flow until gauge 96 balances the reading of gauge 84, whereupon valves 90 and 98 are reclosed and the lever 62 is then raised. In either event, as will be apparent, no continuous flowing or wastage of valuable inert gas from the apparatus is necessary as in the case of conventional structures of this type, nor is any more gas lost during any material changing operation than is contained within the relatively small cubical volume of sleeve 50 and its adjacent piping.

When starting up the operation, as when the head assembly has been removed from flange 20 and is replaced, valves 90 and 92 may be opened, the remaining valves being closed at this time, and a vacuum established upon the interior of the entire structure until gauges 84 and 96 show the desired reading indicating that the proper amount of air has been removed. Thereupon valves 90 and 92 are closed and valve 97 is opened and the inert gas fills the structure to the desired pressure reading on the gauges. As an alternative, valve 88 may be opened to effect this initial removal of air from the structure. Moreover, by means of the vent pipes controlled by valve 86, gas may be swept through the apparatus for a continuous purging action if such is a desired mode of operation. The valve 94 in pipe 93, as well as valve 99, also provides a means for adjusting the degree of vacuum whenever such is desired.

By means of the above-described structure a flexible operation may be secured whereby radioactive samples of differing intensities, sizes and characteristics may be expeditiously handled. In particular, an efficient usage of the relatively expensive inert gas may be realized and a sturdy, rugged structure with excellent sealing characteristics is provided. In its broader aspects the structure herein shown may be used for handling of other than radioactive materials. While for the purpose of explaining the invention, the above embodiment has been described, it will be understood that many modifications will be apparent to those skilled in the art and the invention therefore should be restricted only insofar as set forth in the appended claims.

What is claimed is:

1. In combination, radiation detecting means including an electrode, a stationary chamber, a plate detachably affixed to said chamber and adapted to support said means as a unit, thereby to position the electrode within said chamber, gas supply means connected to said chamber, a material transfer compartment spaced from said chamber, a passageway connecting said chamber and compartment, a movable sealing member adapted to establish a seal between said compartment and said passageway and a movable cover for said compartment.

2. In combination, radiation detecting means including an electrode, a chamber housing the electrode, gas supply means connected to said chamber, vacuum means connected to said chamber, a material transfer compartment spaced from said chamber, a passageway connecting said chamber and compartment, a movable sealing member adapted to establish a seal between said compartment and said passageway and a movable cover for said compartment.

3. Material handling apparatus including, a chamber in which material is positioned with respect to an electrode, a movable sleeve member defining a material transfer compartment spaced from said chamber, a passageway connecting said chamber and compartment, means for moving material between said compartment and said chamber, and a movable cover for said compartment.

4. Apparatus as described in claim 3 wherein said means for moving material is rotatable.

5. Material handling apparatus including, a chamber in which material is positioned with respect to an electrode, a movable sleeve member defining a material transfer compartment spaced from said chamber, a passageway connecting said chamber and compartment, means positioned in said passageway for moving material between said compartment and said chamber, a movable cover for said compartment, and means for moving said sleeve member into and out of contact with said material moving means.

6. Apparatus as described in claim 5, wherein said sleeve member is normally out of contact with said material moving means.

7. Apparatus as described in claim 5, wherein said sleeve member is normally held resiliently out of contact with said material moving means.

8. Material handling apparatus including, a gas-filled chamber in which material is positioned with respect to an electrode, a movable sleeve member defining a material transfer compartment spaced from said chamber, a passageway connecting said chamber and compartment, means positioned in said passageway for moving material between said compartment and said chamber, a movable cover for said compartment, a sealing means on said sleeve member and means for moving said sleeve member into and out of sealing engagement with said material moving means.

9. Apparatus as described in claim 8, wherein said sleeve member is provided with a flexible jacket to prevent escape of gas from said chamber.

10. Apparatus as described in claim 8, wherein said material moving means is actuated externally of said gas filled chamber.

11. Apparatus as described in claim 8, wherein said sleeve member is reciprocable.

12. Material handling apparatus including, a gas filled chamber in which material is positioned with respect to an electrode, a movable sleeve member defining a material transfer compartment spaced from said chamber, a passageway connecting said chamber and compartment, a vacuum means attached to said sleeve member, means positioned in said passageway for moving material between said compartment and said chamber, a movable cover for said compartment, a sealing means on said sleeve member and means for moving said sleeve member into and out of sealing engagement with said material moving means.

13. Apparatus as described in claim 12, wherein said sleeve member is provided with a flexible jacket to prevent leakage of gas into or out of said chamber.

14. Apparatus as described in claim 12, wherein said sleeve member is moved into sealing engagement with said material moving means by actuation of a lever disposed externally of the compartment.

15. Apparatus as described in claim 12, wherein said material moving means is supported in contact with a stationary abutment during the application of pressure thereto by said movable sleeve member.

16. Apparatus as described in claim 12, wherein said material moving means is actuated by a shaft extending externally of the chamber and provided with a seal to prevent leakage of gas into or out of said chamber.

ALBERT GHIORSO.
CARROLL M. GORDON.

REFERENCES CITED

The following references are of record in the file of this patent:

Brown, Nucleonics, August 1948, p. 57.